United States Patent
Jang et al.

(10) Patent No.: US 12,130,034 B2
(45) Date of Patent: Oct. 29, 2024

(54) SERVER, HEAT PUMP SYSTEM, AND METHOD OF AUTHENTICATING INSTALLATION OF HEAT PUMP SYSTEM

(71) Applicant: SAMSUNG ELECTRONICS CO., LTD., Suwon-si (KR)

(72) Inventors: Seok Hyun Jang, Suwon-si (KR); Jae-Yang Lee, Suwon-si (KR); Dong Han Ko, Suwon-si (KR); Yong Sang Kong, Suwon-si (KR); Suk Ho Lee, Suwon-si (KR); Min Chang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 373 days.

(21) Appl. No.: 17/542,600

(22) Filed: Dec. 6, 2021

(65) Prior Publication Data
US 2022/0090809 A1   Mar. 24, 2022

Related U.S. Application Data

(63) Continuation of application No. PCT/KR2020/007250, filed on Jun. 4, 2020.

(30) Foreign Application Priority Data

Jun. 5, 2019   (KR) .................. 10-2019-0066646

(51) Int. Cl.
*F24F 11/49*   (2018.01)
*F24F 11/58*   (2018.01)
*H04L 9/32*    (2006.01)

(52) U.S. Cl.
CPC .............. *F24F 11/49* (2018.01); *F24F 11/58* (2018.01); *H04L 9/3226* (2013.01)

(58) Field of Classification Search
CPC .. F24F 11/49; F24F 11/58; F24F 11/48; F24F 11/63; H04L 9/3226; H04L 63/08;
(Continued)

(56) References Cited

U.S. PATENT DOCUMENTS

| | | | |
|---|---|---|---|
| 7,232,075 B1 * | 6/2007 | Rosen ................ | G05D 23/1902 236/94 |
| 2010/0107111 A1 | 4/2010 | Mirza et al. | |
| 2015/0159895 A1 | 6/2015 | Quam et al. | |

FOREIGN PATENT DOCUMENTS

| | | | |
|---|---|---|---|
| CN | 108362028 A | * | 8/2018 |
| DE | 3838715 A1 | * | 10/1989 |

(Continued)

OTHER PUBLICATIONS

English Translation of DE-3838715-A1 (Year: 1989).*
(Continued)

*Primary Examiner* — Charles R Kasenge
(74) *Attorney, Agent, or Firm* — STAAS & HALSEY LLP

(57) ABSTRACT

Provided is a heat pump system including a compressor for compressing a refrigerant the heat pump system including: an input interface configured to receive an input of an authentication code; a display configured to display the authentication code input through the input interface; and a controller to control an operation of the heat pump system according to whether a control program to control the operation is to be activated based on the authentication code input through the input interface.

9 Claims, 18 Drawing Sheets

(58) Field of Classification Search
CPC .... H04L 9/3228; H04L 9/3234; H04W 12/77; G06F 21/36
See application file for complete search history.

(56) References Cited

FOREIGN PATENT DOCUMENTS

| | | |
|---|---|---|
| JP | 2005-332093 A | 12/2005 |
| JP | 2007-046822 A | 2/2007 |
| KR | 10-2010-0023044 A | 3/2010 |
| KR | 10-2013-0013238 A | 2/2013 |
| KR | 10-2016-0122061 A | 10/2016 |
| KR | 10-2017-0105072 A | 9/2017 |
| KR | 10-1906216 B1 | 10/2018 |
| KR | 10-2019-0125230 A | 11/2019 |

OTHER PUBLICATIONS

English Translation of CN-108362028-A (Year: 2018).*
International Search Report for International Patent Application No. PCT/KR2020/007250 dated Sep. 21, 2020.

* cited by examiner

SERVER, HEAT PUMP SYSTEM, AND METHOD OF AUTHENTICATING INSTALLATION OF HEAT PUMP SYSTEM

CROSS-REFERENCE TO RELATED APPLICATION

This application is a continuation application, under 35 U.S.C. § 111(a), of International Patent Application No. PCT/KR2020/007250, filed Jun. 4, 2020, which claims the foreign priority benefit under 35 U.S.C. § 119 to Korean Patent Application No. 10-2019-0066646, filed Jun. 5, 2019, the contents of both of which are incorporated by reference herein in their entirety.

FIELD

The disclosure relates to a heat pump system using a refrigerant, a method of authenticating an installation of the heat pump system, and a server for installation authentication of the heat pump system.

BACKGROUND

A heat pump cycle, which heats or cools air or water using the transfer of heat generated during evaporation and condensation of a refrigerant, may be used in a variety of products such as air conditioners, refrigerators, freezers, dryers, clothes care systems, boilers, and the like.

Most refrigerants used for the heat pump cycle may affect global warming, because they emit greenhouse gases. A global warming potential (GWP) is a quantified value of greenhouse gas emissions. Recently, the use of low GWP refrigerants is recommended.

Some of the low GWP refrigerants are flammable. When a product using a flammable refrigerant is installed in an unsuitable environment, there is a risk of explosion. Accordingly, it is required to manage the installation environment of products using flammable refrigerants.

SUMMARY

According to an aspect of the disclosure, there is provided a server, including: a memory configured to store an installation condition determined for each type of heat pump system; a communicator configured to receive, from a user terminal, type information of the heat pump system, installation environment information of the heat pump system, and identification information of the heat pump system; and a controller configured to search the memory for an installation condition of the heat pump system based on the received type information, and control the communicator to transmit, to the user terminal, an installation authentication code of the heat pump system based on whether the received installation environment information satisfies the installation condition of the heat pump system.

The controller is configured to generate the installation authentication code of the heat pump system using the received identification information.

The memory is configured to store the installation authentication code for each piece of identification information of the heat pump system.

The controller is configured to generate the installation authentication code of the heat pump system using the received identification information and a predetermined code generation rule.

The controller is configured to generate the installation authentication code of the heat pump system using a code generation rule identical to a predetermined code generation rule used by the heat pump system to generate the installation authentication code.

The installation condition includes at least one of a condition for an amount of refrigerant of the heat pump system, a condition for an area of an installation of the heat pump system, or a condition for an area of ventilation of the heat pump system.

The communicator is configured to receive personal information of a user who installs the heat pump system from the user terminal, and the memory is configured to match the personal information of the user with an installation history of the heat pump system of the user and store the installation history of the heat pump system.

The controller is configured to control the communicator to transmit an installation environment confirmation message to the user terminal based on the received installation environment information not satisfying the installation condition of the heat pump system.

According to an aspect of the disclosure, there is provided a heat pump system including a compressor for compressing a refrigerant, the heat pump system including: an input interface configured to receive an input of an authentication code; a display configured to display the authentication code input through the input interface; and a controller to control an operation of the heat pump system according to whether a control program to control the operation is to be activated based on the authentication code input through the input interface.

The controller is configured to store a unique installation authentication code of the heat pump system and compare the authentication code input through the input interface to the stored unique installation authentication code.

The controller is configured to activate the control program, based on the authentication code input through the input interface matching with the unique installation authentication code of the heat pump system.

The controller is configured to generate the unique installation authentication code of the heat pump system based on identification information of the heat pump system.

The unique installation authentication code of the heat pump system is issued by a server when an installation environment of the heat pump system satisfies a predetermined condition, the server authenticating an installation of the heat pump system.

The input interface includes at least one of a tact switch or a remote controller.

The input interface includes at least one connection port into which an external storage medium is insertable, wherein the controller is configured to read the authentication code from the external storage medium while the external storage medium is inserted in the at least one connection port.

The input interface includes a communication interface that allows communication to be performed with a mobile device by wire or wirelessly, wherein the communication interface is configured to receive the authentication code input through the mobile device.

According to an aspect of the disclosure, there is provided a method of authenticating an installation of a heat pump system, including: receiving type information of the heat pump system and installation environment information of the heat pump system from a user terminal; searching for an installation condition of the heat pump system based on the received type information; and transmitting an installation authentication code of the heat pump system to the user terminal, based on whether the received installation environment information satisfying an installation environment condition of the heat pump system.

The method further includes: receiving identification information of the heat pump system; and generating the installation authentication code of the heat pump system using the received identification information and a predetermined code generation rule.

The method further includes: matching an installation authentication code for each piece of identification information of the heat pump system and storing the installation authentication code in a memory.

The method further includes: receiving the identification information of the heat pump system; and searching the memory for an installation authentication code corresponding to the received identification information.

The generating of the installation authentication code includes generating the installation authentication code using a code generation rule identical to a code generation rule used by the heat pump system to generate a unique installation authentication code.

The installation condition includes at least one of a condition for an amount of refrigerant of the heat pump system, a condition for an area of an installation of the heat pump system, or a condition for an area of ventilation of the heat pump system.

The method further includes: receiving personal information of a user who installs the heat pump system from the user terminal; and matching the personal information of the user with an installation history of the heat pump system of the user and storing the installation history.

The method further includes: transmitting an installation environment confirmation message to the user terminal based on the received installation environment information not satisfying the installation condition of the heat pump system.

According to an aspect of the disclosure, there is provided a heat pump system including a compressor for compressing a refrigerant, including: an input interface configured to receive an input of an authentication code; a display configured to display the authentication code input in the input interface; and a controller in which a control program for controlling an operation of the heat pump system is installed, wherein the controller is configured to compare the authentication code input in the input interface to a unique installation authentication code of the heat pump system and identify whether a test run of the heat pump system is feasible based on a result of the comparison.

The controller is configured to perform a test run according to a command for a test run based on the authentication code input in the input interface matching with the unique installation authentication code of the heat pump system.

BRIEF DESCRIPTION OF DRAWINGS

The above and/or other aspects of the disclosure will be more apparent by describing certain embodiments of the disclosure with reference to the accompanying drawings, in which.

DETAILED DESCRIPTION

Figure 1:
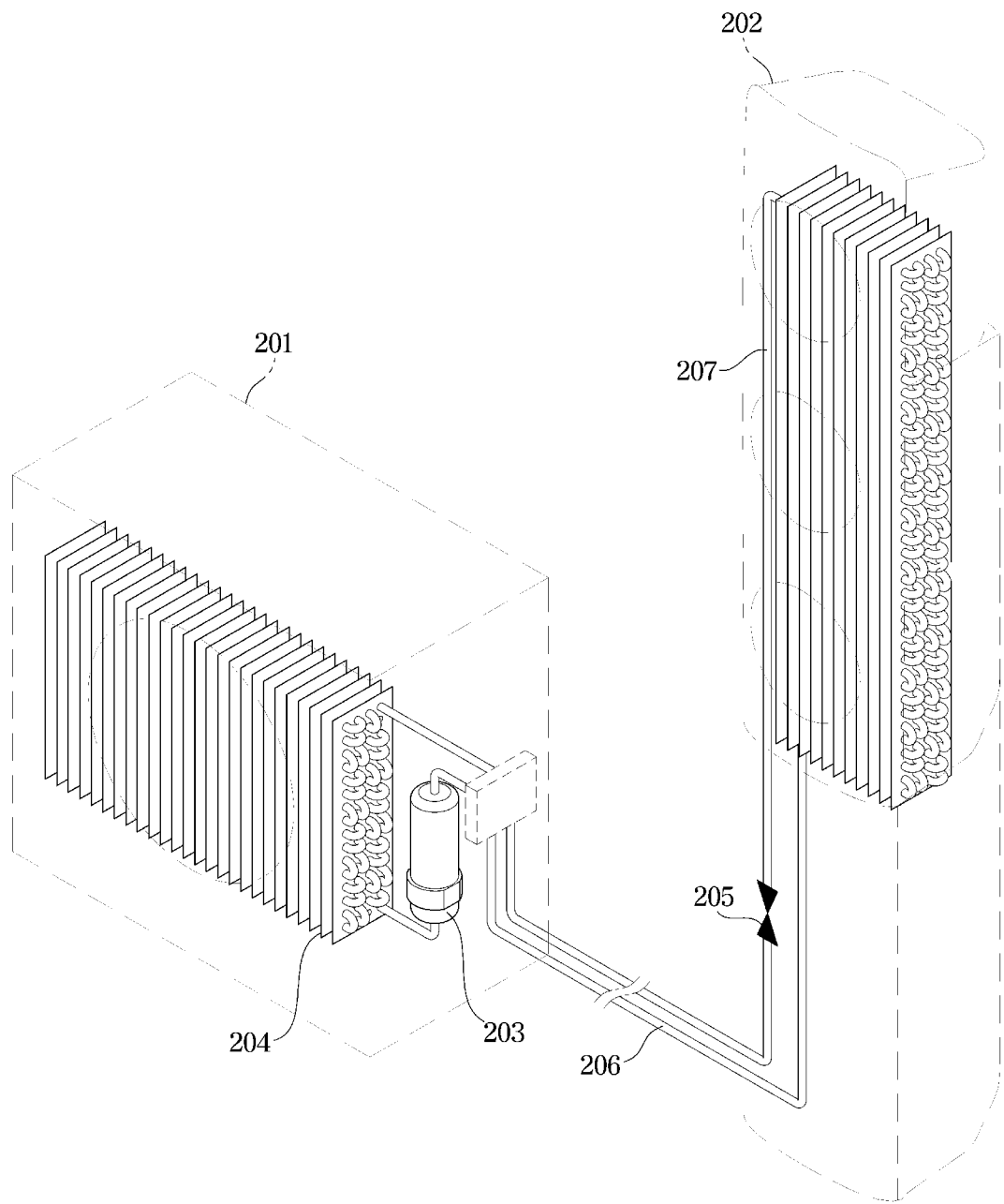
FIG. 1 is a schematic view illustrating a flow of a refrigerant of a heat pump system according to an embodiment of the disclosure.

Like reference numerals throughout the specification denote like elements, and thus their description will be omitted. Also, this specification does not describe all the elements according to embodiments of the disclosure, and descriptions well-known in the art to which the disclosure pertains or overlapped portions are omitted. The terms such as "~part", "~block", "~member", "~module", and the like may refer to a unit for processing at least one function or act. For example, the terms may refer to at least process processed by at least one hardware or software stored in memories or processors. According to embodiments, a plurality of "~parts", "~blocks", "~members", or "~modules" may be embodied as a single element, or a single "~part", "~block", "~member", or "~module" may include a plurality of elements.

It will be understood that when an element is referred to as being "connected" to another element, it can be directly or indirectly connected to the other element, wherein the indirect connection includes "connection" via a wireless communication network.

It will be further understood that the term "include" when used in this specification, specify the presence of stated elements, but do not preclude the presence or addition of one or more other elements.

Throughout the specification, when it is stated that an element transmits a signal or data to another element, still another element may exist between the element and the other element and be transmitted through the still another element, unless otherwise stated.

It is to be understood that the singular forms include plural references unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, a server, a heat pump system, and a method of authenticating an installation of the heat pump system according to an aspect of the disclosure are described in detail with reference to accompanying drawings.

The disclosure provides a server, a heat pump system, and a method of authenticating an installation of the heat pump system that are capable of preventing explosion due to leakage of a flammable refrigerant by managing an installation environment of the heat pump system using the flammable refrigerant.

Specifically, the disclosure provides the server that issues an authentication code to an installer only when the installation environment of the heat pump system using the flammable refrigerant satisfies a predetermined condition, the heat pump system that unlocks only when the issued authentication code is input, and the method of authenticating the installation of the heat pump system.

The server, the heat pump system, and the method of authenticating an installation of the heat pump system according to an aspect of the disclosure can prevent explosion due to leakage of a flammable refrigerant by managing an installation environment of the heat pump system using the flammable refrigerant.

The heat pump system according to an aspect of the disclosure may include a plurality of apparatuses using a heat pump cycle that heats or cools air or water using the transfer of heat generated during evaporation and condensation of a refrigerant. For example, a variety of home appliances used to heat or cool a space such as air conditioners, refrigerators, freezers, dryers, clothes care systems, boilers, etc., may be included in the heat pump system according to an aspect of the disclosure.

Aside from the aforementioned home appliances, other apparatuses using a refrigerant may fall in the scope of the disclosure. Also, even commercial or industrial use of the aforementioned home appliances is not beyond the scope of the disclosure. Change in use may be made from the apparatus where a heat pump cycle using a refrigerant as defined above is applied may fall in the scope of the disclosure.

Hereinafter, an air conditioner is used as an example of the heat pump system according to an embodiment of the disclosure for a detailed explanation.

FIG. 1 is a schematic view illustrating a flow of a refrigerant of a heat pump system according to an embodiment of the disclosure.

As shown in FIG. 1, when the heat pump system 200 is embodied as an air conditioner, the heat pump system 200 may include an outdoor unit 201 and an indoor unit 202. Here, the outdoor unit 201 performs heat exchange between outdoor air and a refrigerant, and the indoor unit 202 performs heat exchange between indoor air and the refrigerant. The outdoor unit 201 and the indoor unit 202 are connected to each other through a refrigerant pipe 206 to form a heat pump cycle including compression, condensation, decompression, and evaporation. Accordingly, elements such as a compressor 203, heat exchangers 204 and 207, an expansion valve 205, the refrigerant pipe 206, and the like may be included in a heat pump.

A space where the indoor unit 202 is installed may be cooled or heated by using transfer of heat generated through evaporation and condensation while the refrigerant circulates in the heat pump cycle.

The outdoor unit 201 may include the compressor 203 that compresses the refrigerant and the outdoor heat exchanger 204 where heat exchange is performed between the refrigerant and outdoor air. The indoor unit 202 may include the expansion valve 205 that decompresses the refrigerant and the indoor heat exchanger 207 where heat exchange is performed between the refrigerant and indoor air.

When the air conditioner operates in a cooling mode, the compressor 203 compresses a low-temperature and low-pressure gaseous refrigerant into a high-temperature and high-pressure gaseous refrigerant, and the high-temperature and high-pressure gaseous refrigerant is condensed into a high-pressure liquid refrigerant below a condensation temperature through the heat exchange between outdoor air in the outdoor heat exchanger 204 to release heat.

The high-pressure gaseous refrigerant supplied from the outdoor heat exchanger 204 is decompressed in the expansion valve 205, and thereby become a low-temperature and low-pressure liquid refrigerant. The low-temperature and low-pressure liquid refrigerant evaporates into a gaseous refrigerant through the heat exchange between indoor air in the indoor heat exchanger 207 to absorb heat. As the refrigerant absorbs the heat, air in a space where the indoor unit 202 is installed may be cooled.

The refrigerant used for heat exchange is mostly composed of substances that affect ozone depletion or global warming, Accordingly, an ozone depletion potential (ODP) or a global warming potential (GWP) is considered when selecting a refrigerant, and some countries regulate an ODP or GWP of refrigerant used in home appliances.

For example, a R32 refrigerant, which is a hydrofluorocarbon (HFC) based refrigerant, has an ODP of 0 and a GWP of 675, which is lower than other HFC refrigerants. Accordingly, the use of R32 or a mixed refrigerant containing R32 is recently increasing. However, a R32 refrigerant has a low flammability. Also, among refrigerants that replace existing refrigerants with little flammability, other refrigerants with flammability exist aside from a R32 refrigerant.

When a flammable refrigerant leaks in an enclosed space, there is a risk of explosion, and thus the heat pump system 200 including such refrigerant is required to be installed in a safe environment for reducing a risk of explosion. Accordingly, a server 100, the heat pump system 200, and a method of authenticating an installation of the heat pump system according to an embodiment of the disclosure provide a process for installing the heat pump system 200 in an environment that complies with safety regulations.

Figure 2:
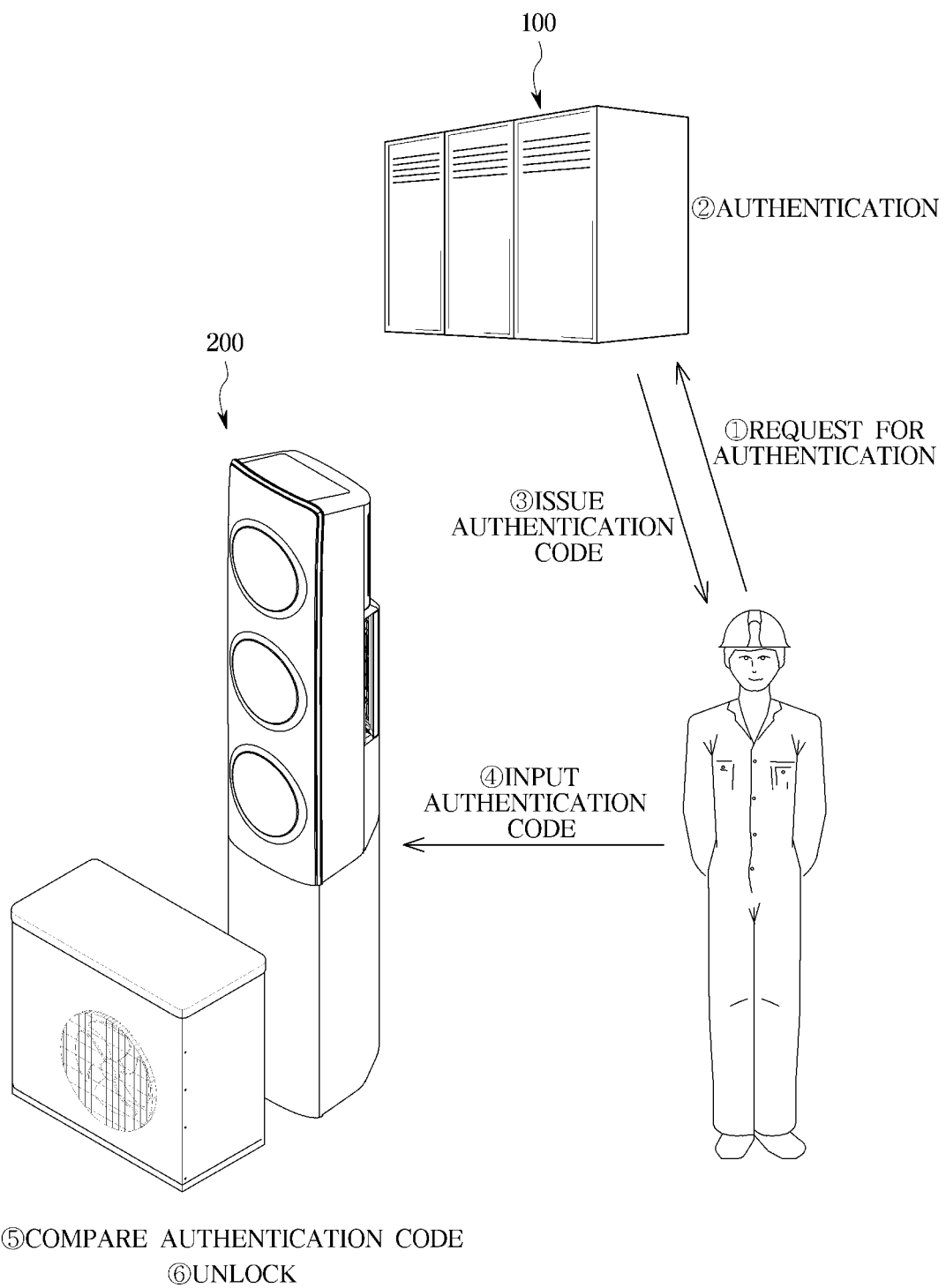
FIG. 2 is a schematic view illustrating operations of a server and a heat pump system according to an embodiment of the disclosure.

FIG. 2 is a schematic view illustrating operations of a server and a heat pump system according to an embodiment of the disclosure.

Referring to FIG. 2, when installing the heat pump system 200, an installer requests ① a server 100 for an authentication. The server 100 authenticates an installation of the heat pump system. Here, the installer may be an engineer who professionally installs the heat pump system 200, or a user who purchases and uses the heat pump system 200. Accordingly, hereinafter, all subjects who install the heat pump system 200 are referred to as a user.

The server 100 performs an authentication ② with respect to an installation of the heat pump system 200. A process for the authentication ② will be described in detail later.

When the authentication is completed by the server 100, the server 100 issues ③ an authentication code, and the user inputs ④ the issued authentication code to the heat pump system 200.

The heat pump system 200 compares ⑤ the input authentication code to a unique authentication code. Also, when the input authentication code matches with the unique authentication code, the heat pump system 200 unlocks ⑥.

According to the processes described above, only when the authentication for the installation of the heat pump system 200 is complete, the heat pump system 200 may operate, and thus a risk of explosion due to refrigerant leakage in an unsafe environment may be reduced.

Hereinafter, operations of the server 100 and the heat pump system 200 are described in greater detail.

Figure 3:
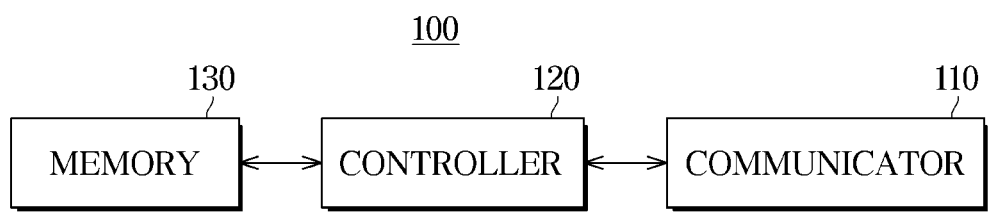
FIG. 3 is a control block diagram illustrating a server according to an embodiment of the disclosure.

FIG. 3 is a control block diagram illustrating a server according to an embodiment of the disclosure. FIGS. 4 to 6 and FIG. 8 are diagrams illustrating examples of screens displayed on a user terminal used when a user requests a server for authentication according to an embodiment of the disclosure. FIG. 7 and FIG. 9 are diagrams illustrating examples of information stored in a memory according to an embodiment of the disclosure.

Referring to FIG. 3, the server 100 includes a memory 130 that stores an installation condition determined for each type of the heat pump system 200; a communicator 110 that receives type information, installation environment information, and identification information of the heat pump system from a user terminal; and a controller 120 that searches the memory 130 for an installation condition of the heat pump system 200 based on the received type information, and controls the communicator 110 to transmit an installation authentication code of the heat pump system to the user terminal, based on the received installation environment information satisfying the installation condition of the heat pump system.

The memory 130 may include a non-volatile memory such as read only memory (ROM), erasable programmable read only memory (EPROM), electrically erasable programmable read only memory (EEPROM), flash memory, etc., and may further include a volatile memory such as static random access memory (S-RAM), dynamic random access memory (D-RAM), and the like. The non-volatile memory or volatile memory may be used depending on a type of information to be stored.

The controller 120 may include at least one memory that stores a program for performing the aforementioned operations and operations to be described later, and at least one processor for executing the stored program. The memory 130 described above may be included in the controller 120 and a memory of the controller 120 may be included in the memory 130 described above.

The communicator 110 may include a wireless communication interface capable of transmitting and receiving data by communicating with the user terminal located at a remote place. The wireless communication interface may include at least one of various communication interfaces that may be connected to the Internet by wireless communication such as wireless fidelity (WiFi), wireless broadband (WiBro), global system for mobile communications (GSM), code division multiple access (CDMA), wideband CDMA (WCDMA), universal mobile telecommunications system (UMTS), time division multiple access (TDMA), long term evolution (LTE), 4th generation (4G) mobile communication, 5th generation (5G) mobile communication, and the like.

Figure 4:
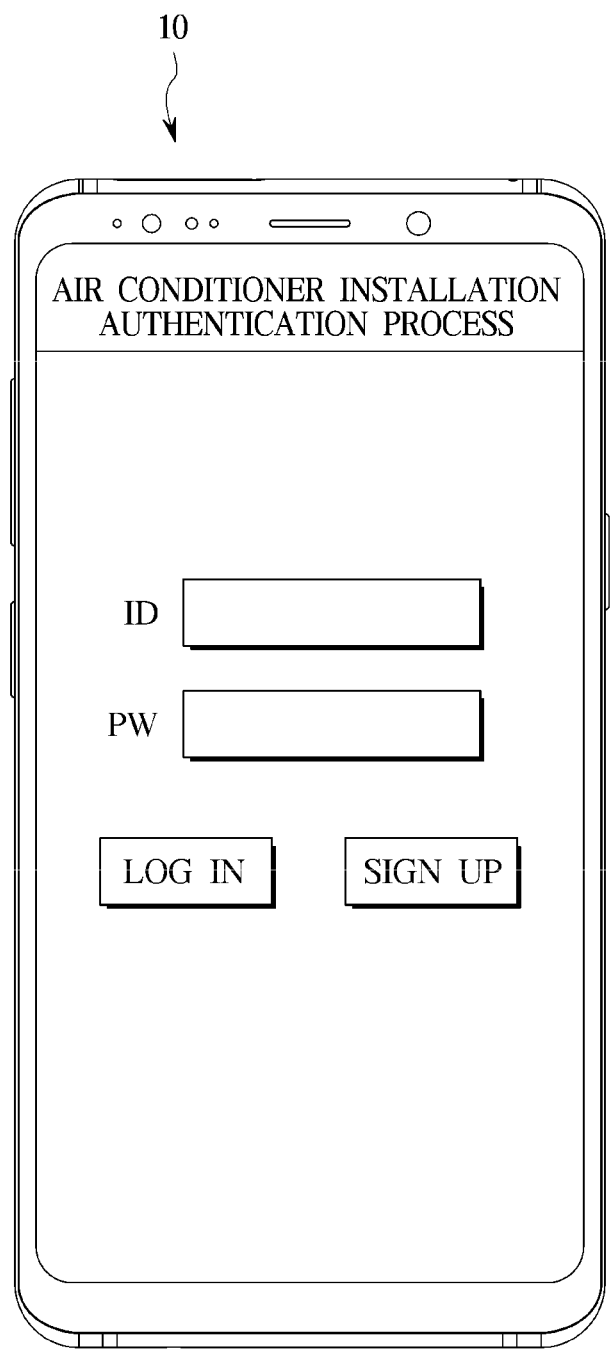
FIGS. 4, 5, 6 and FIG. 8 are diagrams illustrating examples of screens displayed on a user terminal used when a user requests a server for authentication according to an embodiment of the disclosure.

The user is required to access the server 100 to request the server 100 for an authentication for an installation of the heat pump system 200. In this instance, as shown in FIG. 4, the user may use a user terminal 10. The user terminal 10 may be a mobile device connected to a wireless Internet network, e.g. a smart phone, a personal digital assistant (PDA), a laptop computer, etc., or a terminal provided to the user for authentication only.

A program or an application used for installation authentication of the heat pump system 200 may be installed in the user terminal 10. The user may attempt to access the server 100 by implementing the program or running the application.

The server 100 may require personal information from the user who attempts to access the server 100. Here, the personal information may include a variety of information that may be used to identify a plurality of users and track a specific user as needed, e.g. a name, contact information, an address, a department to which the user belongs, and the like.

For instance, the server 100 may request membership registration for acquiring the personal information from the user. The user may input the user's personal information for the membership registration, and the input personal information may be matched with a user identifier (ID) set by the user at the time of membership registration and stored in the memory 130.

However, according to embodiments, the user may input the user's personal information each time the user accesses the server 100 without the membership registration.

The server 100 acquires, stores, and manages the personal information of the user who installs the heat pump system 200, and thus the heat pump system 200 may be safely installed by the user who is authenticated or trusted.

As shown in FIG. 4, the user who has completed the membership registration may access the server 100 by logging in by entering an ID and a password through the user terminal 10.

Figure 5:
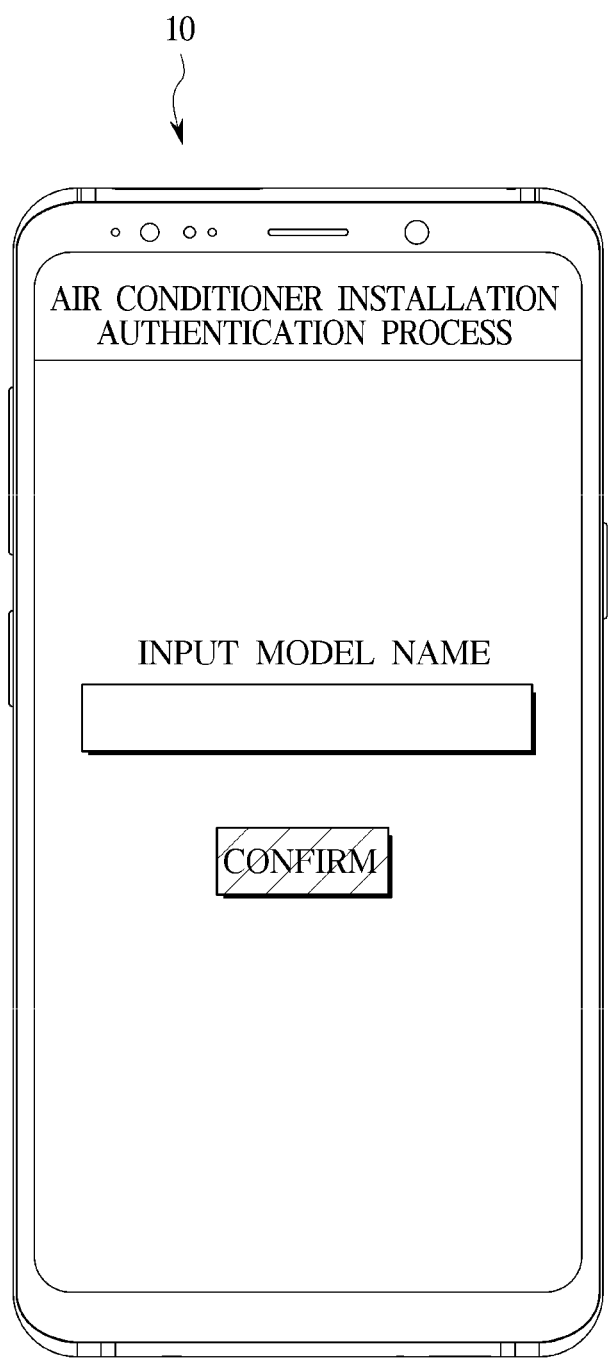

When the login is complete, the server 100 may request the user for the type information of the heat pump system. Also, as shown in FIG. 5, the user may input the type information of the heat pump system to the user terminal 10. Here, the heat pump system refers to a heat pump system that the user is currently installing or attempts to install.

The heat pump system may be classified according to various criteria, and mainly classified according to the use of the heat pump system, e.g. an air conditioner, a boiler, a refrigerator, a dryer, and the like. Also, even the same air conditioner may be classified again based on a performance, an appearance, a size (capacity), etc.

That is, the type information may be information indicating to which group the heat pump system, classified into a plurality of groups according to the criteria such as performance, appearance, size (capacity), etc., belongs. For example, the type information may include a model name of the heat pump system. In this instance, the user may input the model name of the heat pump system into the user terminal 10.

However, different model names may be provided for each capacity according to naming rules of a manufacturer of the heat pump system, and even heat pump systems having the same model name may have different capacities. In the latter case, the user may input both the model name of the heat pump system and the capacity together. That is, the type information that is input to the user terminal 10 is not limited, as long as the installation condition of the heat pump system may be distinguished.

The type information that is input to the user terminal 10 is transmitted to the server 100, and the communicator 110 of the server 100 may receive the type information.

Figure 6:
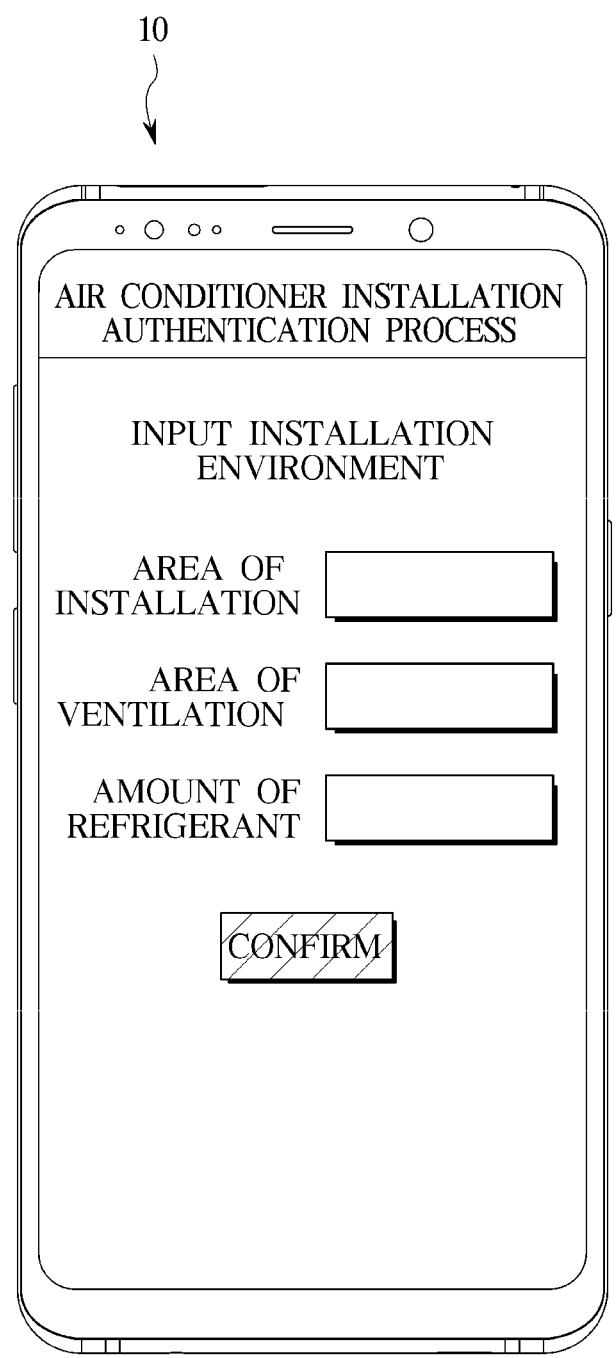
Figure 7:
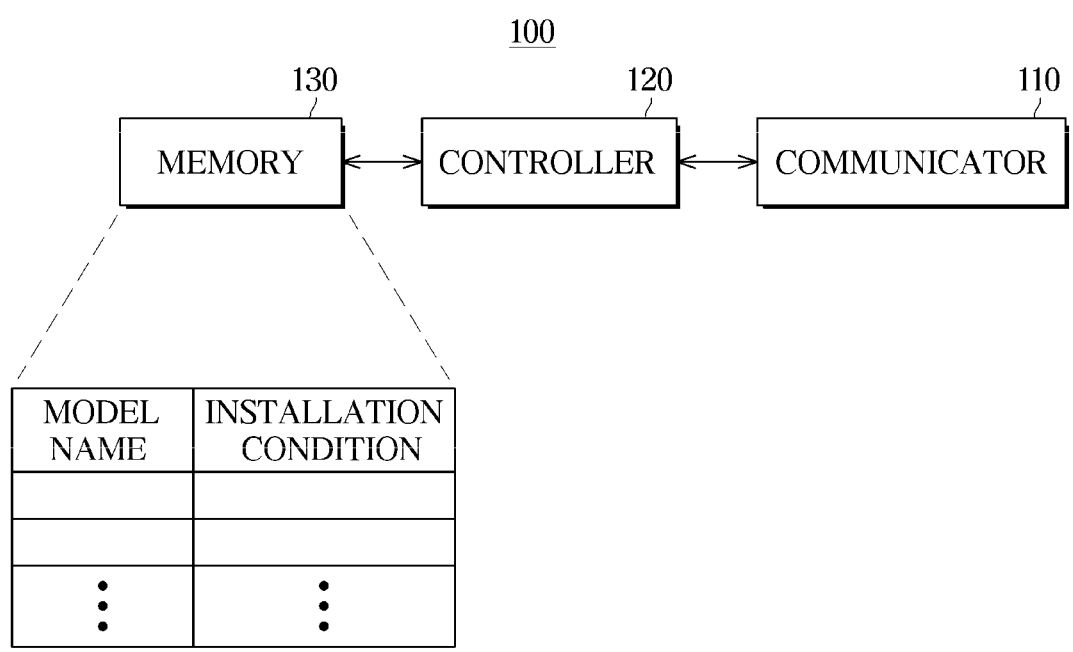
FIG. 7 and FIG. 9 are diagrams illustrating examples of information stored in a memory according to an embodiment of the disclosure.

As shown in FIG. 6, the server 100 may request the installation environment information of the heat pump system. For example, the installation environment information of the heat pump system may include at least one of an area of an installation, an area of ventilation, or the amount of refrigerant. As described below, the server 100 requests the user for the installation environment information to identify whether an installation environment of the heat pump system 200 satisfies a predetermined installation condition with respect to a corresponding product. The predetermined installation condition is in accordance with regulations or standards governing an installation environment of a product using a flammable refrigerant. A standard applied to the server 100 and the heat pump system 200 according to an embodiment may be the EN378 standard.

The area of installation refers to an area of a space where the heat pump system is installed. For instance, when a heat pump system to be installed is an air conditioner, the area of installation refers to an area of a space where an indoor unit of the air conditioner is installed.

The area of ventilation refers to an area of a section that may access outside air in the space where the heat pump system is installed. For instance, when the heat pump system to be installed is an air conditioner and an indoor unit of the heat pump system to be installed is installed in a room, the area of ventilation may refer to an area of a door of the room or a window of the room. Also, when a separate vent or a separate ventilation opening is provided, an area of the separate vent or ventilation opening may be included in the area of ventilation.

The amount of refrigerant injected is determined according to a type or capacity of the heat pump system. The amount of refrigerant included in the installation environment refers to the amount of injection determined according to the type or capacity of the heat pump system.

When the user inputs the installation environment information including at least one of the area of installation, the area of ventilation, or the amount of refrigerant, the user terminal 10 may transmit the input installation environment information to the server 100, and the communicator 110 of the server 100 may receive the installation environment information.

The installation condition for each type of the heat pump system may be stored in the memory 130 of the server 100. For example, as shown in FIG. 7, the installation condition determined for each model of the heat pump system may be matched and stored in the memory 130. As described above, the installation condition stored in the memory 130 may be regulations or standards governing an installation environment of a product using a flammable refrigerant. For instance, when the EN378 standard is applied, an installation condition for area of an installation, an area of ventilation, or the amount of refrigerant for each model of the heat pump system in accordance with the EN378 standard may be matched and stored in the memory 130. The installation condition for the area of installation, the area of ventilation, or the amount of refrigerant may be stored as a specific value or a range determined by at least one of a lower limit value or a upper limit value.

The controller 120 of the server 100 may search the memory 130 for an installation condition of a corresponding product based on the type information received by the communicator 110. The controller 120 may identify whether the received installation environment information satisfies the installation condition of the corresponding product.

Based on the installation environment information of the heat pump system satisfying the installation condition, the controller 120 acquires an installation authentication code of the corresponding product and issues the installation authentication code to the user. The installation authentication code issued to the user is a unique code of the heat pump system to be installed. Accordingly, the server 100 may request the user for identification information of the heat pump system to be installed to acquire a unique installation authentication code of the heat pump system to be installed.

Figure 8:
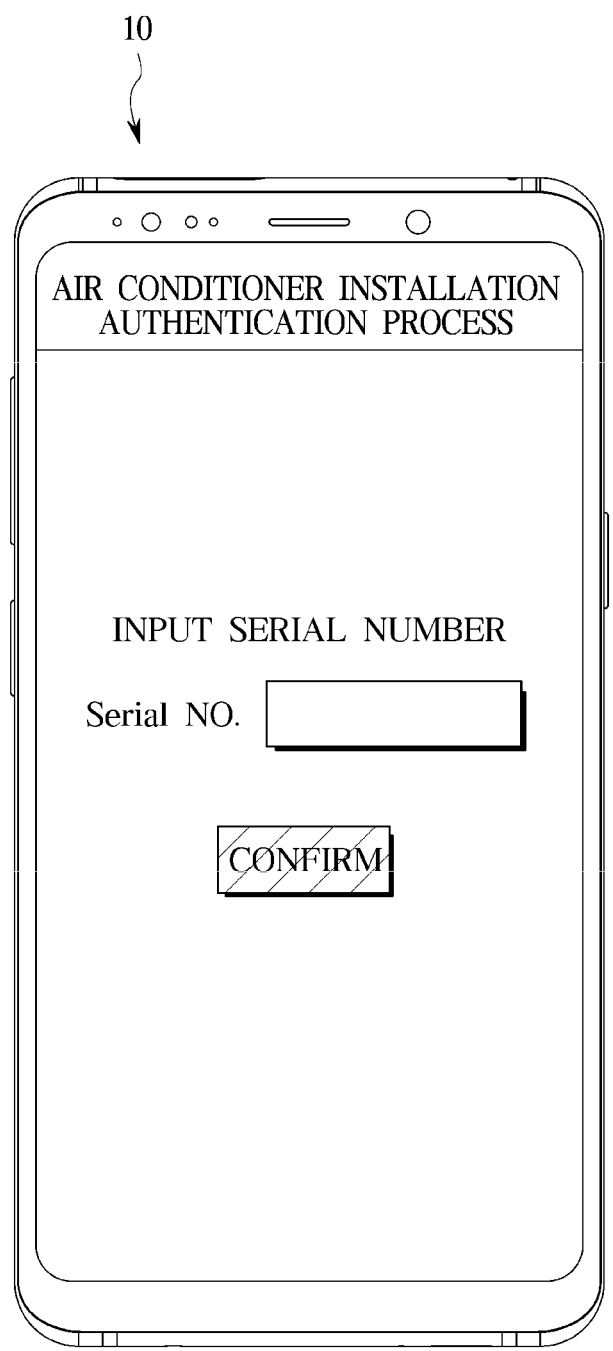
Figure 9:
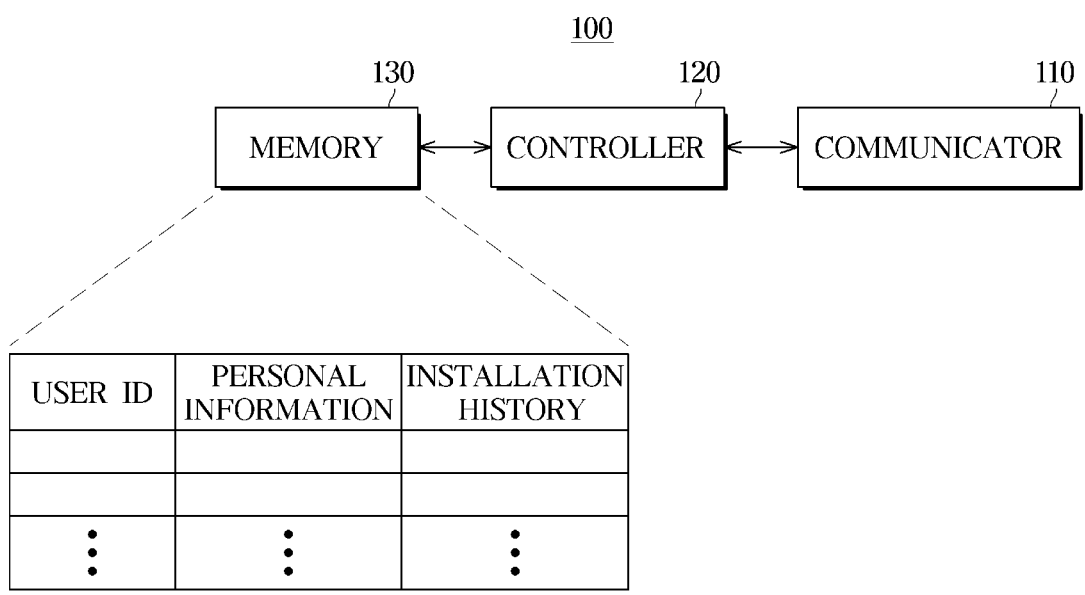

As shown in FIG. 8, the user may input the identification information of the heat pump system to be installed, e.g. a serial number, to the user terminal 10, and the user terminal 10 transmits the input serial number to the server 100. The communicator 110 of the server 100 may receive the input serial number.

Meanwhile, the identification information of the heat pump system to be installed may be requested to be input, when the installation environment information satisfies the installation condition, or regardless of whether the installation condition is satisfied. When the identification information is input regardless of whether the installation condition is satisfied, a history may be matched to an user ID and stored in the memory 130, even when the authentication fails because the installation environment information does not satisfy the installation condition.

The controller 120 may by itself generate and acquire the installation authentication code of the heat pump system, or search for and read the installation authentication code stored in the memory 130.

When the controller 120 by itself generates the installation authentication code, the installation authentication code may be generated using the identification information of the heat pump system to be installed and a predetermined code generation rule. In this instance, the identification information of the heat pump system to be installed is transmitted from the user terminal 10. Because the identification information of the heat pump system to be installed is used, the generated installation authentication code is a unique code of the corresponding product. However, using the identification information and the code generation rule is only an example, and any method that may generate a unique code of an individual heat pump system is applicable.

When the installation authentication code is stored in the memory 130, a unique installation authentication code may be assigned to each product and stored in the heat pump system 200 and the server 100, respectively, in a production stage of heat pump system.

Alternatively, the installation authentication code may be assigned and stored in the heat pump system 200 in advance, and the server 100 may generate the installation authentication code as described above, when the user requests for an installation authentication of the heat pump system 200. In this instance, the installation authentication code generated by the server 100 is identical to the installation authentication code stored in the heat pump system 200, and thus the server 100 does not require to store the installation authentication codes with respect to all the heat pump systems 200 to be subject to installation authentication in advance. Accordingly, memory capacity may be saved.

By contrast, the installation authentication code may be stored in the server 100 and the heat pump system 200 may generate the installation authentication code as described above when the heat pump system 200 is installed.

That is, a unique installation authentication code is issued for each individual heat pump system, which may prevent the user from repeatedly using a previously issued installation authentication code without the installation authentication process described above when the user installs the heat pump system. Accordingly, an installation authentication may be required each time the heat pump systems is installed, and the heat pump system may be installed and used in a safe environment.

The controller 120 may transmit the acquired installation authentication code to the user terminal 10 through the communicator 110. The user terminal 10 may display the transmitted installation authentication code on a display. The user who acquires the installation authentication code through the user terminal 10 may activate the heat pump system to be installed by inputting the installation authentication code to the heat pump system to be installed, which is described in detail later.

As shown in FIG. 9, the controller 120 may store an installation history of the heat pump system for each user in the memory 130. For instance, whether to be authenticated and the identification information inputted by the user may be matched to a corresponding user's ID and stored. When a single user accesses the server again after being authenticated and obtains an installation authentication for another heat pump system, identification information and whether to be authenticated with respect to the other heat pump system may be additionally matched to the user's ID and stored. That is, an installation history of the user may be added.

As described above, the personal information of the user is matched to the user's ID and stored in the memory 130. Accordingly, identification information and installation history of heat pump system may be identified for each of a plurality of users using the information stored in the memory 130, and thus, when an error occurs in an installed heat pump system, personal information of a user who installed the heat pump system may be acquired from the memory 130.

Hereinafter, operations of unlocking by inputting an installation authentication code issued by the server 100 in the heat pump system 200 are described.

Figure 10:
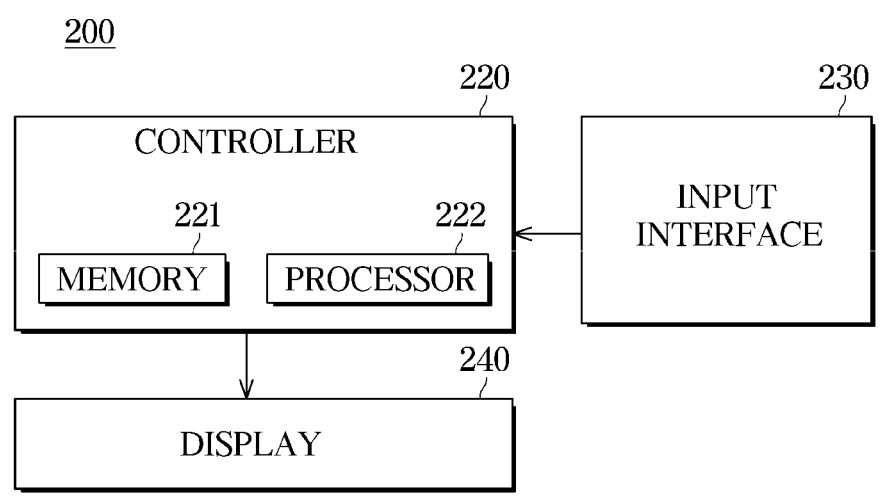
FIG. 10 is a control block diagram illustrating a heat pump system according to an embodiment of the disclosure.

FIG. 10 is a control block diagram illustrating a heat pump system according to an embodiment of the disclosure.

Referring to FIG. 10, according to an embodiment, the heat pump system 200 may include an input interface 230 that receives an input of an authentication code from a user at the time of installation; a controller 220 that identifies whether to activate an operation of the heat pump system 200 based on the input authentication code; and a display 240 that displays the input installation authentication code.

According to an embodiment, the heat pump system 200 may have a unique installation authentication code for each product, and activate the operation by unlocking only when an authentication code matching with the unique installation authentication code is input in the heat pump system 200 at the time of installation of the heat pump system 200. As described above, the unique installation authentication code of the heat pump system 200 may be issued by the server 100 to only user who is authenticated for installation environment of the heat pump system 200. Accordingly, the heat pump system 200 may be installed in a safe installation environment authenticated by the server 100.

For the above, the input interface 230 that receives an input from the user is provided in the heat pump system 200. The input interface 230 may include an input part that directly receives an input by manipulation of the user, a communication interface connected to an external device by wired or wireless communication, or a connection port that connected to an external storage medium. A specific input method for each type of the input interface 230 is described later.

The controller 220 may include at least one memory 221 storing a program for performing the aforementioned operations and operations described below, and at least one processor implementing a stored program. The memory 221 may include a non-volatile memory such as read only memory (ROM), erasable programmable read only memory (EPROM), electrically erasable programmable read only memory (EEPROM), flash memory, etc., and may further include a volatile memory such as static random access memory (S-RAM), dynamic random access memory (D-RAM), and the like. The non-volatile memory or volatile memory may be used depending on a type of information to be stored. For example, persistent information such as the identification information of the heat pump system 200 may be stored in the non-volatile memory.

When an authentication code is input, the controller 220 identifies whether to activate the operation of the heat pump system 200 based on the input authentication code. Specifically, the controller 220 may identify whether the input authentication code matches with a unique installation authentication code of the heat pump system 200, and activate the operation of the heat pump system 200 based on the input authentication code matching with the unique installation authentication code. In this instance, the unique installation authentication code of the heat pump system 200 may be generated by the controller 220 itself at the time of installation of the heat pump system 200, or be assigned to each individual heat pump system 200 and stored in the memory 221.

The unique installation authentication code stored in the individual heat pump system 200 in advance or generated by the individual heat pump system 200 is required to be identical to the installation authentication code issued by the server 100 with respect to the same heat pump system 200. For the above, an identical installation authentication code may be stored in the heat pump system 200 and the server 100, respectively, or the heat pump system 200 and the server 100 may generate an installation authentication code by applying identification information of the heat pump system 200 to a same code generation rule.

When the controller 220 generates the unique installation authentication code of the heat pump system 200 by itself, the controller 220 may use identification information of the heat pump system 200 stored in the memory 221 and a code generation rule to generate the unique installation authentication code of the heat pump system 200, when the heat pump system 200 is installed and power is applied. In this instance, the code generation rule is the same as that used when the server 100 generates the installation authentication code.

The controller 220 compares the generated installation authentication code to an authentication code input by the user. Based on the generated installation authentication code matching with the authentication code input by the user, the controller 220 may activate the operation of the heat pump system 200 by unlocking the heat pump system 200. When the generated installation authentication code and the authentication code input by the user do not match, the controller 220 deactivates the operation by maintaining a lock state of the heat pump system 200.

When the unique installation authentication code is stored in the memory 221 in advance and an authentication code is input by the user, the controller 220 compares the stored unique installation authentication code to the input authentication code. Based on the input authentication code matching with the unique installation authentication code stored in the memory 221, the controller 220 may activate the operation of the heat pump system 200 by unlocking the heat pump system 200.

In the embodiment, activating or deactivating the operation of the heat pump system 200 may refer to activating or deactivating a control program of the heat pump system 200. Also, a deactivation state of the control program or the operation refers to a state that a test run or general run is not performed when a command for the test run or general run is entered in the heat pump system 200. By contrast, activating the control program or operation refers to a state that a test run or general run is performed when a command for the test run or general run is entered in the heat pump system 200.

Meanwhile, in some heat pump systems 200, lock is not released unless the test run is normally complete. In this case, activating the control program based on the unique installation authentication code matching with the input authentication code refers to activating the control program to the extent that a test run may be performable, and activating the control program to the extent that a general run may be performable varies depending on whether the test run is complete.

FIGS. 11 to 16 are diagrams illustrating examples where an installation authentication code is input in an input interface of a heat pump system according to an embodiment of the disclosure.

Hereinafter, an air conditioner is used as an example of the heat pump system 200 according to an embodiment of the disclosure.

Figure 11:
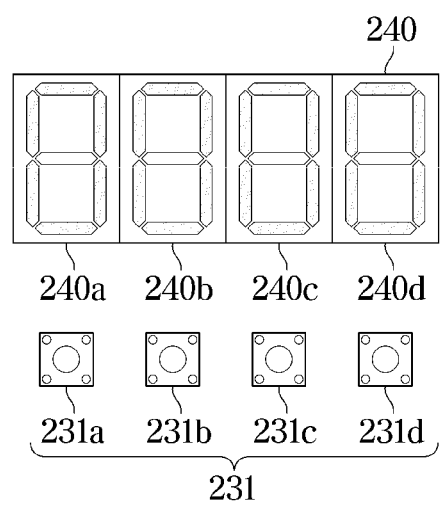
FIGS. 11, 12, 13, 14, 15 and 16 are diagrams illustrating examples where an installation authentication code is input in an input interface of a heat pump system according to an embodiment of the disclosure.

Referring to FIG. 11, an input interface 230 may include a tact switch 231. For example, when the heat pump system 200 is embodied as an air conditioner, as shown in FIG. 11, the tact switch 231 may be provided in the outdoor unit 201, and a display 240 using 7-segments may be provided.

When the tact switch 231 includes a plurality of keys 231*a*, 231*b*, 231*c* and 231*d*, different functions may be assigned to each of the plurality of keys 231*a*, 231*b*, 231*c* and 231*d*. Also, when an individual key is pressed, a function assigned to the pressed key may be performed. Further, because an input value of each key varies each time a key is pressed, different functions may be assigned according to the number of times the key is pressed.

For instance, the K1 switch 231*a* and the K2 switch 231*b* may be assigned to a special operation of the outdoor unit 201 such as a heating test run, refrigerant charging, refrigerant recovery, automatic inspection, and the like. When the K1 switch 231*a* is pressed once, the heating test run may be performed, and when the K1 switch 231*a* is pressed twice, an operation for refrigerant charging may be performed. Also, when the K2 switch 231*b* is pressed twice, an operation for refrigerant recovery may be performed.

In addition, when the K3 switch 231*c* is assigned to a reset function of an outdoor unit program and is pressed once, the outdoor unit program may be forcibly reset to be initialized. When the K4 switch 231*d* is assigned to a function for checking state information of an outdoor unit sensor/load, etc., and is pressed once, an outdoor temperature value may be displayed on the display 240.

The display 240 using 7-segments may display four digits in total or alphabetic characters, and may be left blank. The number of digits and alphabetic characters displayed may be adjusted according to a configuration of a printed circuit board assembled (PBA) circuit.

For example, the display 240 may display that the outdoor/indoor unit is in a state of communication tracking, and display that an error occurs when a communication line between the outdoor unit and the indoor unit is cut. Also, as described above, when the heating test run is performed by pressing the K1 switch 231*a* once, letters indicating the heating test run is being performed may be displayed on the display 240. Also, when the K4 switch 231*d* is pressed once, the outdoor temperature sensor value may be displayed on the display 240.

However, the operations described above may be performed when the heat pump system 200 is unlocked. The tact switch 231 and the display 240 are used to receive an input of an authentication code, before unlocking.

When the tact switch 231 and the display 240 are used to receive an input of an authentication code, each space in the display 240 may be assigned to each switch. That is, a first space 240*a*, a second space 240*b*, a third space 240*c* and a fourth space 240*d* may be assigned to the K1 switch 231*a*, the K2 switch 231*b*, the K3 switch 231*c*, and the K4 switch 231*d*, respectively.

The first space 240*a* may display an input value of the K1 switch 231*a*. For example, 1 may be displayed when the K1 switch 231*a* is pressed once, and 2 may be displayed when the K1 switch 231*a* is pressed twice. An input value of a switch assigned to each of the other spaces may be displayed in the same manner.

Every time an input value is entered through the tact switch 231, the controller 220 may compare the input authentication code and the unique installation authentication code of the heat pump system 200. Based on the input authentication code matching with the unique installation authentication code of the heat pump system 200, the controller 220 may control the display 240 to display a message indicating an installation authentication is complete. When the input authentication code and the unique installation authentication code of the heat pump system 200 do not match, the controller 220 may control the display 240 to display an error message indicating the installation authentication fails.

Also, based on the input authentication code matching with the unique installation authentication code of the heat pump system 200, the control program of the heat pump system 200 may be activated and the tact switch 231 and the display 240 using 7-segments may perform the functions described above.

Alternatively, the input interface 230 may include a dual in-line package (DIP) switch and an authentication code may be input using a combination of DIP switches. Further, the input interface 230 may include an input device provided separately for inputting the authentication code, and the authentication code may be input by connecting the input device and the heat pump system 200.

Figure 12:
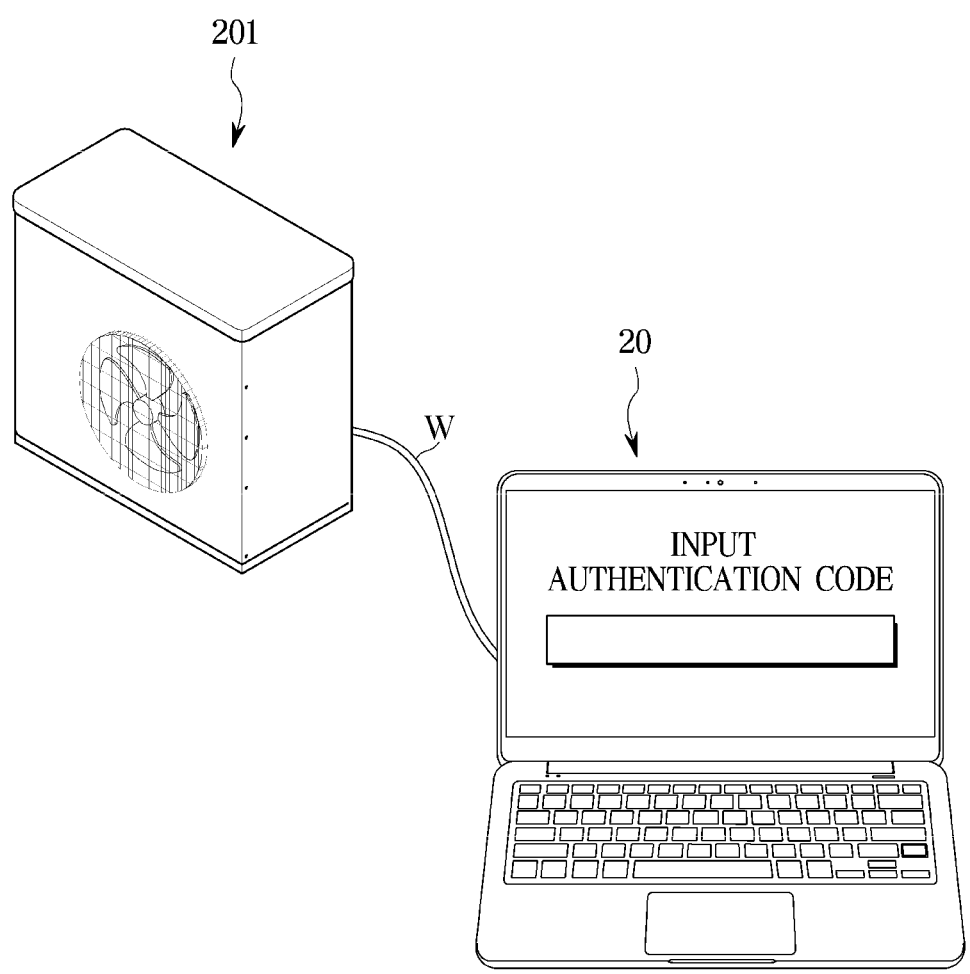

Meanwhile, the outdoor unit 201 and the indoor unit 202 may be connected by wire to communicate with each other. In this instance, the input interface 230 may include a wired communication interface. For example, the outdoor unit 201 and the indoor unit 202 may be connected to each other in a RS485 communication method. As shown in FIG. 12, the heat pump system 200 may be connected to a user terminal 20 in a wired communication method connecting the outdoor unit 201 and the indoor unit 202. In this instance, an installation authentication code may be input through the user terminal 20 connected to the outdoor unit 201 by wire W.

Here, the user terminal 20 is a mobile device used by a user who installs the heat pump system 200 to input the authentication code to the heat pump system 200. The user terminal 20 may be the same as or different from the user terminal 10 used to access the server 100 and receive the installation authentication code.

An application or a program for inputting the installation authentication code to the heat pump system 200 may be installed in the user terminal 20. The user may execute the application or the program installed in the user terminal 20 and input the authentication code using an input part provided in the user terminal 20.

The heat pump system 200 may receive the authentication code from the user terminal 20 through the input interface 230. Also, as described above, the controller 220 may compare the received authentication code and the unique installation authentication code of the heat pump system 200.

Figure 13:
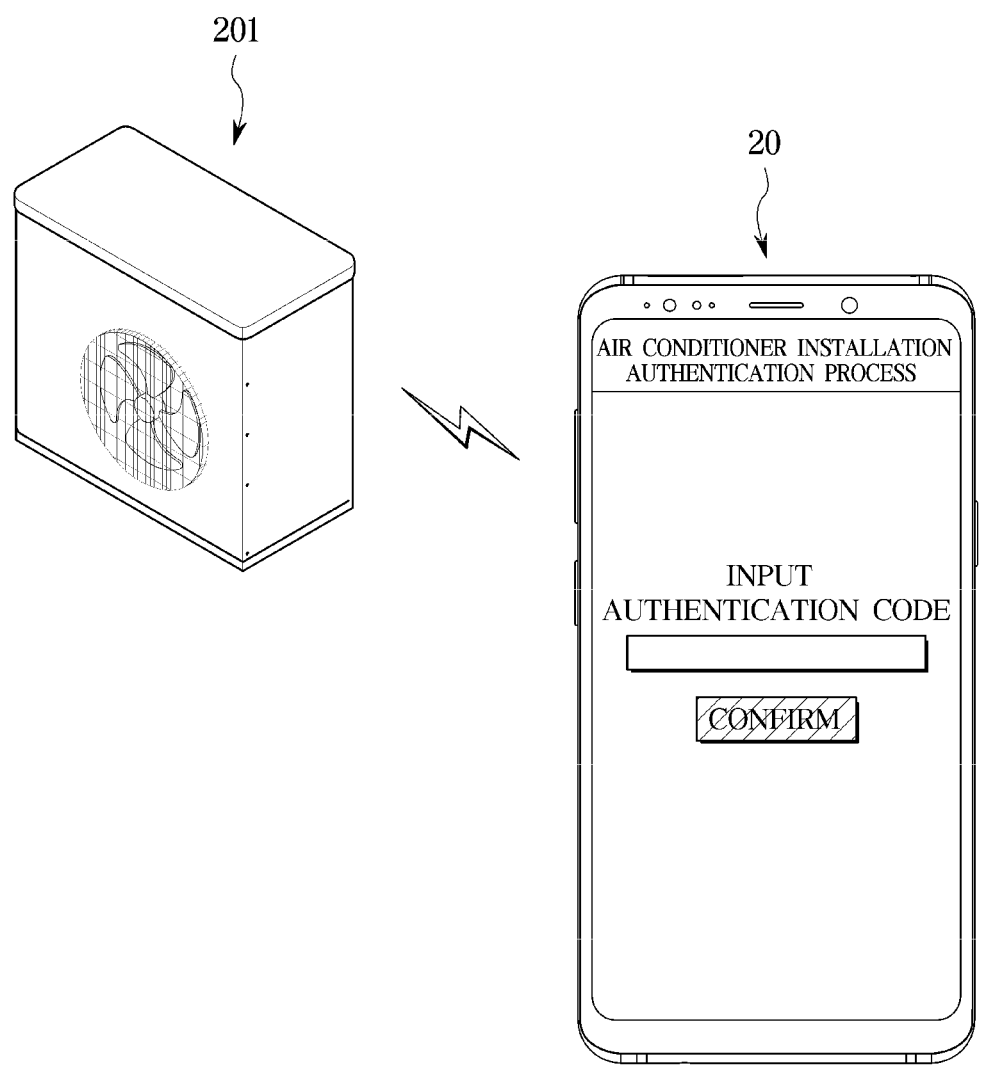

The input interface 230 may include a wireless communication interface that enables WiFi, Bluetooth, LTE, $4^{th}$ generation mobile communication, $5^{th}$ generation mobile communication, and the like. In this instance, as shown in FIG. 13, the heat pump system 200 may be wirelessly connected to the user terminal 20, and the user may input the authentication code using the input part of the user terminal 20. The operation thereafter is the same as the description above.

Meanwhile, the installation authentication code issued by the server 100 may be an encrypted code such as a barcode or a quick response (QR) code, not a simple combination of numbers or characters. In this instance, as shown in FIG. 15, the installation authentication code issued by the server 100 may be input to the heat pump system 200 by photographing using the user terminal 20.

Figure 14:
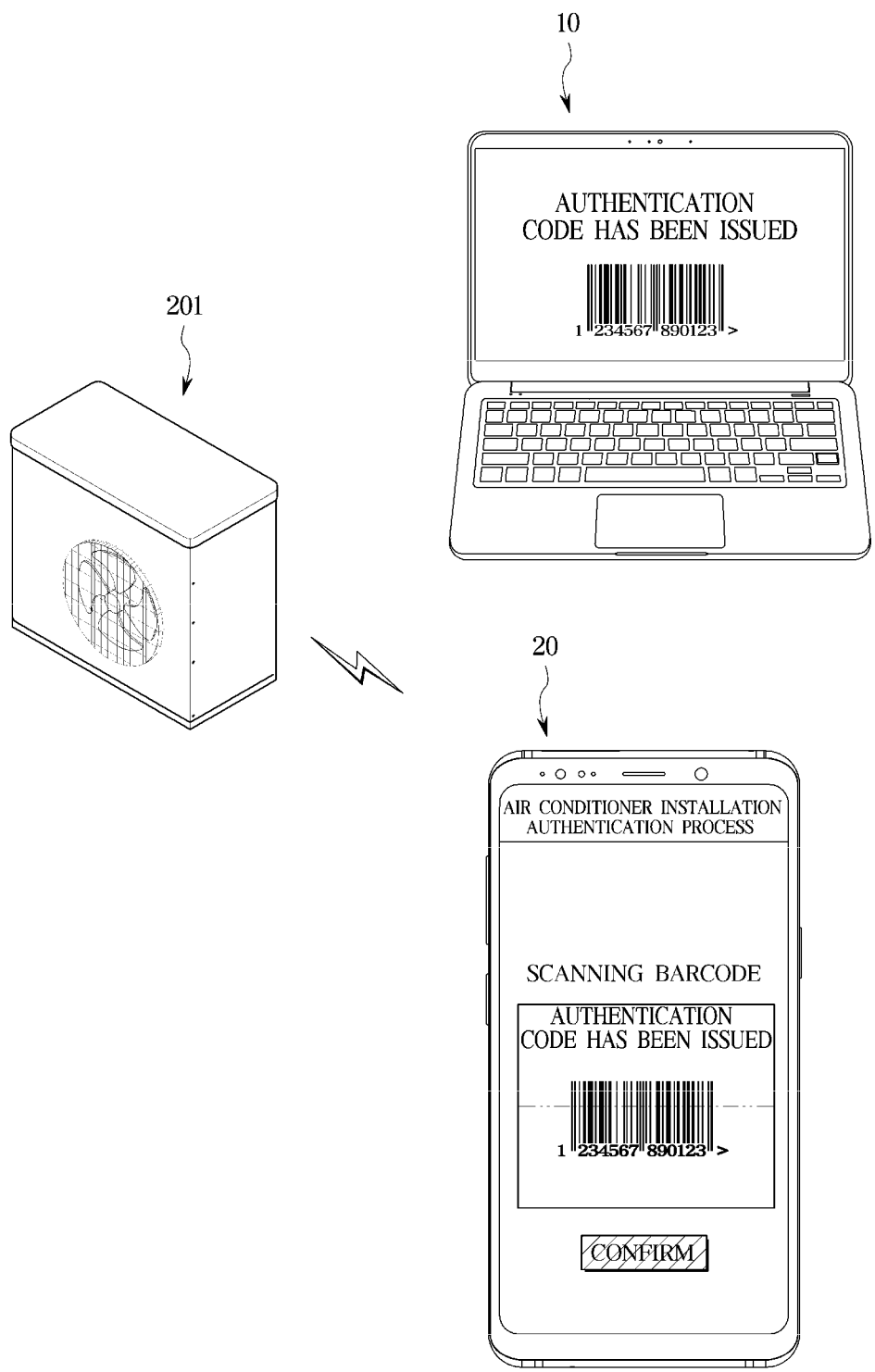

According to an embodiment shown in FIG. 14, when the installation authentication code is displayed on the user terminal 10 used to receive the installation authentication code from the server 100, the displayed installation authentication code may be photographed and transmitted to the heat pump system 200 by the user terminal 20 used to input the authentication code to the heat pump system 200. Although FIG. 15 illustrates an example where the user terminal 20 and the heat pump system 200 are wirelessly connected to each other, the user terminal 20 and the heat pump system 200 may be connected by wire.

Figure 15:
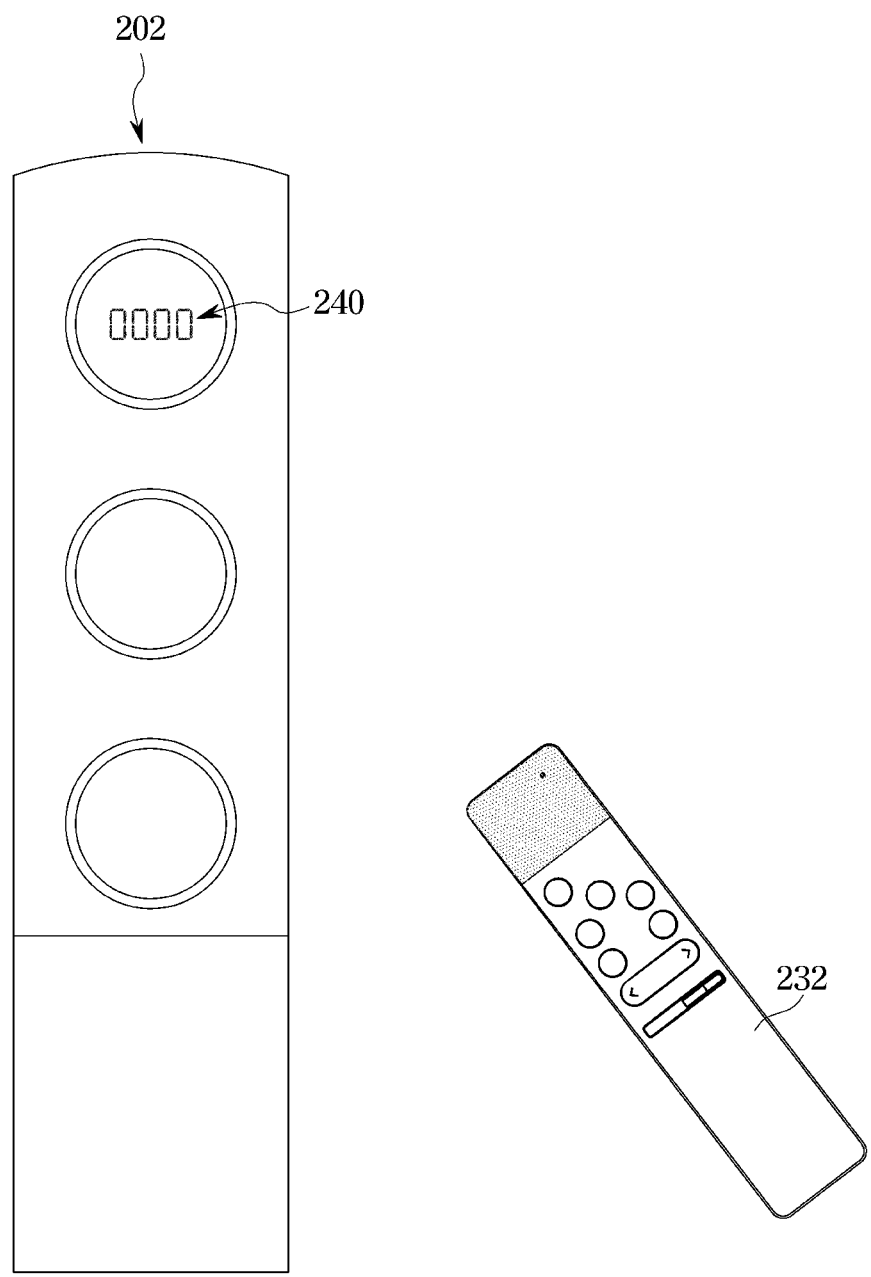

As shown in FIG. 15, when heat pump system 200 is embodied as an air conditioner, the authentication code may be received by using an input part provided in the indoor unit 202. For example, the input interface 230 may include a remote controller 232 that transmits a control command to the indoor unit 202, and the user may input the authentication code using the remote controller 232.

The input authentication code may be displayed on the display 240 of the indoor unit 202. Also, according to a result of the comparing by the controller 220, a message indicating an authentication completion or authentication failure may be displayed on the display 240.

Figure 16:
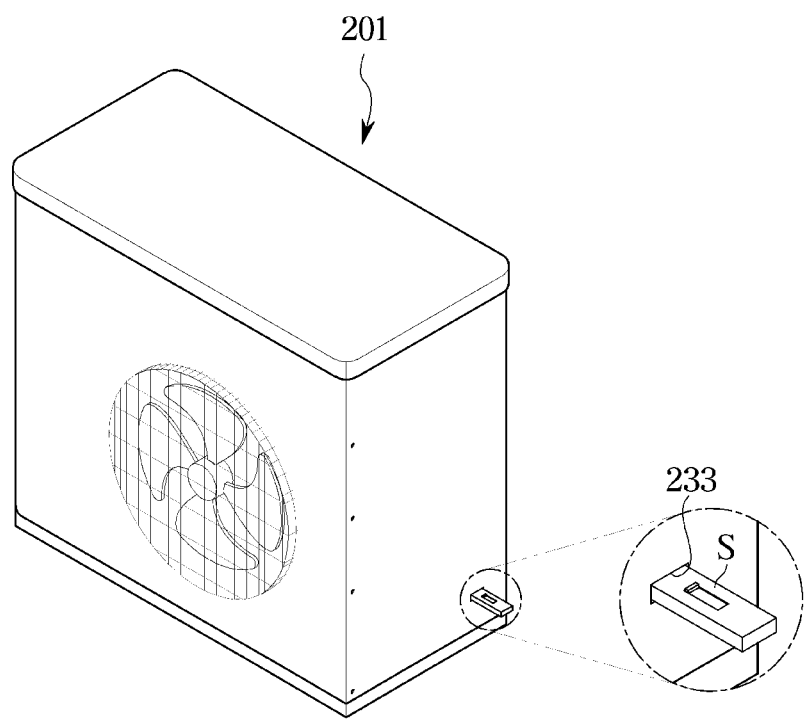

As shown in FIG. 16, the input interface 230 may include a connection port 233 that may be connected to an external storage medium S. The external storage medium S connected to the input interface 230 may be one of universal serial bus (USB), secure digital (SD) card, EEPROM, and the like, capable of reading and writing. In this instance, when the installation authentication code issued by the server 100 is stored in the external storage medium S and the external storage medium S is inserted into the connection port 233, the controller 220 may read the installation authentication code stored in the external storage medium S.

Although it has been described as an example where the input interface 230 is provided in the outdoor unit 201 of the air conditioner, the input interface 230 may be provided in the indoor unit 202. Also, when the heat pump system 200 is not an air conditioner, the above-described example may be modified and applied to a configuration of a corresponding heat pump system 200.

Hereinafter, an embodiment of a method of authenticating an installation of a heat pump system according to an aspect of the disclosure is described. In this instance, the server 100 or the heat pump system 200 described above may be used to implement the method of authenticating the installation of the heat pump system. Accordingly, the description with reference to FIGS. 1 to 16 is applicable to the method of authenticating an installation of a heat pump system according to an aspect of the disclosure, even when not specifically described. Also, the method described below may be applied to an embodiment of the server 100 or the heat pump system 200.

Figure 17:
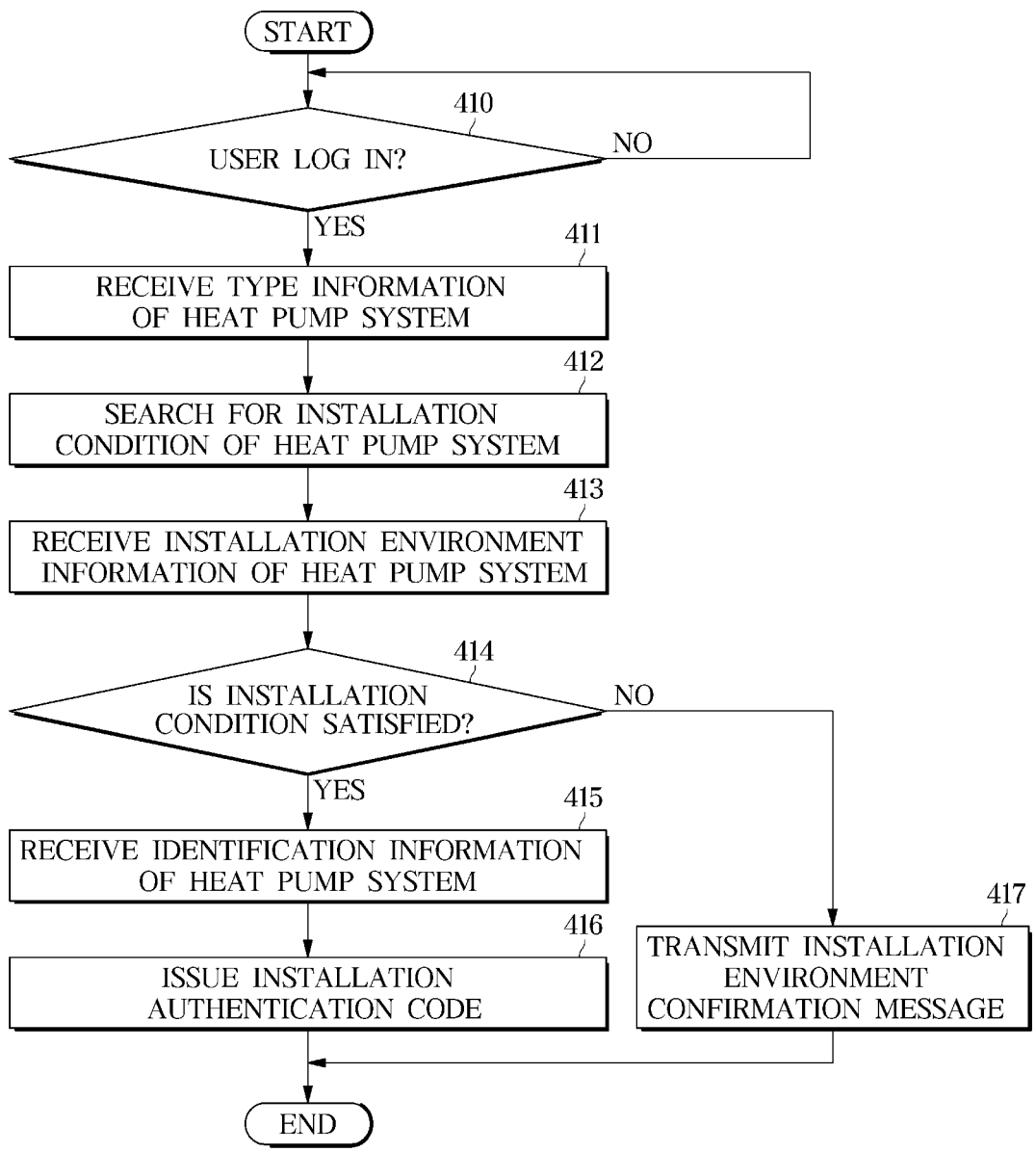
FIG. 17 is a flowchart illustrating operations of issuing an installation authentication code by a server in a method of authenticating an installation of a heat pump system according to an embodiment of the disclosure.

FIG. 17 is a flowchart illustrating operations of issuing an installation authentication code by a server in a method of authenticating an installation of a heat pump system according to an embodiment of the disclosure.

Referring to FIG. 17, when a user accesses the server 100, i.e. when the user logs in (Yes in operation 410), type information of the heat pump system is received from the user (411). Here, the type information of the heat pump system refers to type information of the heat pump system 200 that a user currently attempts to install, i.e. type information of a product to be installed. For example, the type information of the heat pump system 200 may include a model name, or include both a model name and capacity.

The user may access the server 100 through the user terminal 10. When the type information of the heat pump system 200 is input to the user terminal 10, the user terminal 10 may transmit the input type information to the server 100, and the communicator 110 of the server 100 receives the type information.

Meanwhile, the user may sign up for membership before logging in to the server 100, and personal information such as a name, contact information, a department to which the user belongs, and the like, may be input for membership registration. The server 100 acquires, stores, and manages the personal information of the user who installs the heat pump system 200, and thus the heat pump system 200 may be safely installed by the user who is authenticated or trusted.

An installation condition of the heat pump system is searched (412). As shown in FIG. 7, an installation condition for each type of the heat pump system 200 may be stored in the memory 130 of the server 100. The installation condition stored in the memory 130 may be regulations or standards governing an installation environment of a product using a flammable refrigerant. For instance, when EN378 standard is applied, installation conditions for an area of an installation, an area of ventilation, or the amount of refrigerant for each type of the heat pump system in accordance with the EN378 may be matched and stored in the memory 130. When the type information of the heat pump system 200 is received, the controller 120 may search the memory 130 for an installation condition matching the received type information.

Installation environment information of the heat pump system is received (413). The server 100 may request the user for the installation environment information of the heat pump system 200. The user may input, to the user terminal 10, the installation environment information of the heat pump system 200 such as the area of installation, the area of ventilation, and the amount of refrigerant. Also, the user terminal 10 may transmit the input installation environment information to the server 100, and the communicator 110 of the server 100 receives the input installation environment information.

Whether the installation condition of the heat pump system is satisfied is identified (414). The controller 120 of the server 100 may identify whether the installation environment information input by the user satisfies a predetermined installation condition with respect to the heat pump system 200 to be installed.

When the installation condition is satisfied (Yes in operation 414), identification information of the heat pump system is received (415). When the installation condition is not satisfied (No in operation 414), an installation environment confirmation message is transmitted to the user terminal 10 (417).

The server 100 may request the user for identification information of the heat pump system 200 to be installed to issue a unique installation authentication code to the heat pump system 200. The user may input the identification information of the heat pump system 200 to be installed to the user terminal 10, and the user terminal 10 may transmit the input identification information to the server 100. The communicator 110 of the server 100 may receive the input identification information of the heat pump system to be installed.

The unique installation authentication code is issued to the heat pump system (416). The issuance of the installation authentication code may include acquisition and transmission of the installation authentication code. The controller 120 of the server 100 may by itself generate and acquire the installation authentication code of the heat pump system to be installed, or search for and read the installation authentication code stored in the memory 130.

When the controller 120 by itself generates the installation authentication code, the installation authentication code may be generated by using the identification information of the heat pump system to be installed and a predetermined code generation rule. In this instance, the identification information of the heat pump system to be installed is transmitted from the user terminal 10. When the installation authentication code is stored in the memory 130, a unique installation authentication code may be assigned to each product and stored in the heat pump system 200 and the server 100, respectively, in a production stage of heat pump system. Alternatively, the installation authentication code is assigned and stored in the heat pump system 200 in advance, and the server 100 may generate the installation authentication code as described above when the user requests for an installation authentication of the heat pump system 200. Alternatively, the installation authentication code may be stored in the server 100, and the heat pump system 200 may generate the installation authentication code as described above when the heat pump system 200 is installed.

The installation authentication code issued by the server 100 may be received by the user terminal 10, and the user may input the installation authentication code received by the user terminal 10 to the heat pump system 200 to unlock.

However, the method of authenticating the installation of the heat pump system according to an embodiment of the disclosure is not limited to the operations illustrated in FIG. 17. The installation condition may be searched after receiving the installation environment information of the heat pump system 200, and the identification information of the heat pump system 200 may be received regardless of whether the installation condition is satisfied. When the identification information is input regardless of whether the installation condition is satisfied, a history may be matched to an user ID and stored in the memory 130, even when the authentication fails because the installation environment information does not satisfy the installation condition.

Figure 18:
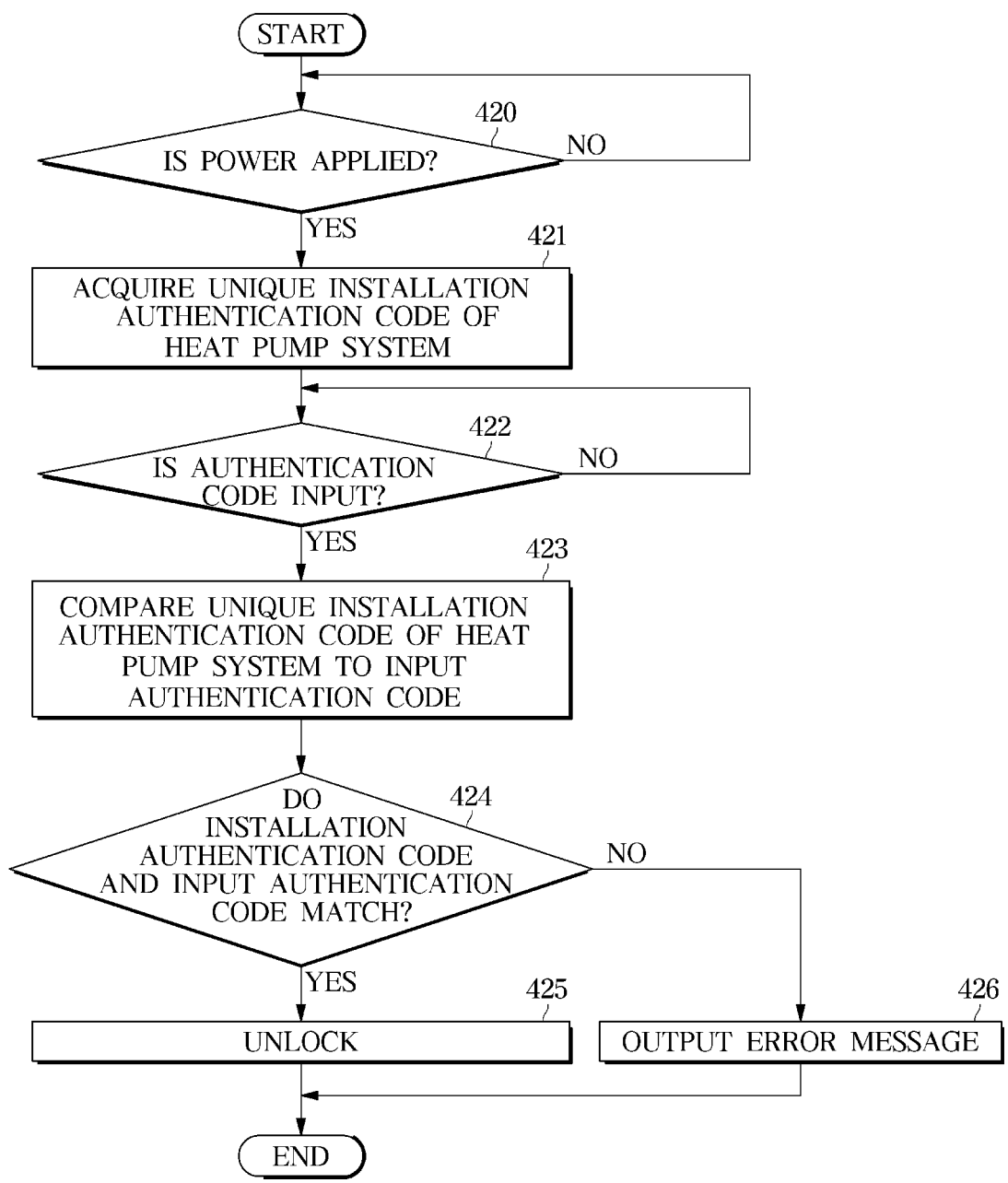
FIG. 18 is a flowchart illustrating operations of unlocking a heat pump system by inputting an installation authentication code by a user to the heat pump system in a method of authenticating an installation of the heat pump system according to an embodiment of the disclosure.

FIG. 18 is a flowchart illustrating operations of unlocking a heat pump system by inputting an authentication code by a user to the heat pump system in a method of authenticating an installation of the heat pump system according to an embodiment of the disclosure.

As shown in FIG. 18, when the heat pump system is installed and power is applied (Yes in operation 420), a unique installation authentication code is acquired (421).

Because the installation authentication code is acquired by the controller 220 of the heat pump system 200, the controller 220 may by itself generate the installation authentication code using identification information stored in the memory 221 and a predetermined code generation rule, or may read the installation authentication code stored in the memory 221. In both cases, the installation authentication code of the heat pump system 200 is unique to a corresponding product, and is identical to the installation authentication code issued by the server 100 with respect to the corresponding product.

When an authentication code is input by the user (Yes in operation 422), the controller 220 compares the installation authentication code to the input authentication code (423). Operations for inputting the authentication code to the heat pump system 200 are the same as described above with reference to FIGS. 11 to 16.

When the installation authentication code acquired by the controller 220 matches with the input authentication code (Yes in operation 424), the controller 220 unlocks the heat pump system 200 (425) to activate a control program. When the installation authentication code acquired by the controller 220 and the input authentication code do not match (No in operation 424), an error message indicating an authentication failure is outputted (426). The output error message may be displayed on the display 240 and be output in a form of voice through a speaker provided in the heat pump system 200.

According to an embodiment of the disclosure, the server 100, the heat pump system 200, and the method of authenticating the installation of the heat pump system may enable the heat pump system to be used in an authenticated installation environment by authenticating installation only when an installation environment of the heat pump system meets a predetermined safety standard, and thus the heat pump system can be safely installed and a risk of explosion can be reduced.

Also, the heat pump system can be installed by an authenticated or trusted user only and an installation history for each user can be managed, and thus the heat pump system can be installed in a safe environment.

Meanwhile, the disclosed embodiments may be embodied in the form of recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

Although embodiments of the disclosure have been described with reference to the accompanying drawings, a person having ordinary skilled in the art will appreciate that other specific modifications may be easily made without departing from the technical spirit or essential features of the disclosure. Therefore, the foregoing embodiments should be regarded as illustrative rather than limiting in all aspects.

What is claimed is:
1. A heat pump system including a compressor for compressing a refrigerant, the heat pump system comprising:
    an input interface configured to receive an input of an authentication code;

a display configured to display the authentication code input through the input interface; and a controller in which a control program for controlling an operation of the heat pump system is installed and configured to identify whether to activate the control program based on the authentication code input through the input interface, wherein the controller comprises at least one processor and at least one memory storing a unique installation authentication code of the heat pump system, wherein the controller is configured to:
    compare the authentication code input through the input interface to the unique installation authentication code stored in the at least one memory, and
    activate the control program in response to the authentication code input through the input interface matching the unique installation authentication code of the heat pump system, wherein the unique installation authentication code of the heat pump system is identical to an installation authentication code that is issued by a server when an installation environment of the heat pump system satisfies a predetermined condition, the server being configured to authenticate an installation of the heat pump system, wherein the installation environment comprises an amount of the refrigerant and the predetermined condition comprises a condition for the amount of the refrigerant.

2. The heat pump system of claim 1, wherein the controller is configured to generate the unique installation authentication code of the heat pump system based on identification information of the heat pump system.

3. The heat pump system of claim 1, wherein the input interface comprises at least one of a tact switch or a remote controller.

4. The heat pump system of claim 1, wherein the input interface comprises at least one connection port into which an external storage medium is insertable,
    wherein the controller is configured to read the authentication code from the external storage medium while the external storage medium is inserted in the at least one connection port.

5. The heat pump system of claim 1, wherein the input interface comprises a communication interface that allows communication to be performed with a mobile device by wire or wirelessly,
    wherein the communication interface is configured to receive the authentication code input through the mobile device.

6. A method of authenticating an installation of a heat pump system, comprising:
    receiving type information of the heat pump system and installation environment information of the heat pump system from a user terminal;
    receiving identification information of the heat pump system;
    generating an installation authentication code of the heat pump system using the received identification information and a predetermined code generation rule;
    matching the installation authentication code for each piece of identification information of the heat pump system and storing the installation authentication code in a memory;
    searching for an installation condition of the heat pump system based on the received type information; and
    transmitting an installation authentication code of the heat pump system to the user terminal, based on whether the received installation environment information satisfies an installation environment condition of the heat pump system, wherein the heat pump system is further comprising at least one processor and at least one memory storing a unique installation authentication code, wherein the unique installation authentication code of the heat pump system is identical to an installation authentication code that is issued by a server when an installation environment of the heat pump system satisfies a predetermined condition, the server authenticating an installation of the heat pump system, wherein the installation environment comprises an amount of a refrigerant and the predetermined condition comprises a condition for the amount of the refrigerant.

7. The method of claim 6, further comprising:
    searching the memory for an installation authentication code corresponding to the received identification information.

8. The method of claim 6, wherein the installation condition further comprises at least one of a condition for an area of an installation of the heat pump system, or a condition for an area of ventilation of the heat pump system.

9. The method of claim 6, further comprising:
    receiving personal information of a user who installs the heat pump system from the user terminal; and
    matching the personal information of the user with an installation history of the heat pump system of the user and storing the installation history of the heat pump system.

\* \* \* \* \*